United States Patent [19]

Branlard et al.

[11] 4,189,567
[45] Feb. 19, 1980

[54] PROCESS FOR PREPARING POWDERED RUBBER

[75] Inventors: Paul Branlard, Grenoble; Jean-Pierre Merle, Echirolles, both of France

[73] Assignee: Distugil, Paris, France

[21] Appl. No.: 893,682

[22] Filed: Apr. 5, 1978

[30] Foreign Application Priority Data

Apr. 7, 1977 [FR] France ................. 77 10524

[51] Int. Cl.$^2$ .............................................. C08F 6/22
[52] U.S. Cl. ................................... 528/485; 526/295; 526/338; 526/340
[58] Field of Search ........................................ 528/485

[56] References Cited

U.S. PATENT DOCUMENTS

| 2,604,467 | 7/1952 | Crouch et al. | 260/85.1 |
| 3,235,527 | 2/1966 | Sparks | 260/29.7 |
| 3,502,629 | 3/1970 | Strachan | 260/92.3 |
| 3,896,093 | 7/1975 | Valoti et al. | 528/485 |

FOREIGN PATENT DOCUMENTS 49-14549  2/1974  Japan .

*Primary Examiner*—Stanford M. Levin
*Attorney, Agent, or Firm*—Browdy and Neimark

[57] ABSTRACT

Homogeneous free-running powders, mixable when dry and with a mean particle size of between 0.1 and 5 mm, are obtained by high-temperature flocculation in the presence of aluminum polyhydroxychloride salts. The temperature is preferably between 70° and 100° C. and the pH is preferably 6 to 13.

6 Claims, No Drawings

PROCESS FOR PREPARING POWDERED RUBBER

FIELD OF THE INVENTION

The present invention relates to a process for isolating rubbers from their aqueous dispersions (latex) in the form of free-running powders with a given particle size, and powdered rubbers prepared by this method.

BACKGROUND OF THE INVENTION

The rubbers according to the present invention are understood to be synthetic rubbers used as elastomers, binders, or coating substances. The synthetic rubbers prepared by emulsion polymerization include, in particular, homopolymers of butadiene and chloroprene, as well as their copolymers with ethylenically-unsaturated compounds such as ethylenic and vinyl-aliphatic compounds; α-methylene carboxylic acids, their esters, nitriles and amides such as alkyl acrylates and methacrylates, acrylonitrile, acrylamide, methacrylonitrile, and methacrylamide; vinyl-aromatic compounds such as vinylnaphthalene; styrene; and substituted styrenes. Also included are polymers of 2,3-dichloro-1,3-butadiene. Modifiers can be incorporated in order to limit or fix the length of the polymer chain and its degree of crosslinking. They may contain fractions of the sol type (benzene- and toluene-soluble), the gel type, or solgel mixtures.

These rubbers are generally prepared by polymerization of the monomer or monomers in the aqueous phase in the presence of emulsifiers using surfactants such as primary and secondary alkyl sulfates or sulfonates, soaps of colophony of pine resin or of unprocessed or disproportionated, hydrogenated, or partially polymerized woods alone or in combination and with or without the presence of non-ionic surfactants such as condensates of ethylene oxide on fatty acids and fatty alcohols or on phenols. Known vulcanization systems can be incorporated partially or wholly into these rubbers. The resulting polymer is in the form of a fine stable dispersion of rubber in the aqueous phase. Latexes and processes for preparing them are known. In general, latexes contain 10-60% by weight of solid material with respect to the total quantity of latex. The solid material can be recovered by coagulating the latex using, as coagulation agents, certain water-soluble salts with or without the presence of mineral or organic acids and with or without the presence of organic polyelectrolytes according to the nature of the emulsifier. Water-soluble salts known for coagulating properties include, in particular, the sulfates, chlorides, nitrates, and acetates of sodium, calcium, iron, zinc and aluminum.

However, coagulation in the presence of the usual water-soluble salts usually leads to formation of a coagulant or non-homogeneous lumps with particle sizes ranging from a few microns to one or more centimeters and in some cases having a strong tendency to reagglomerate, which, in the case of certain elastomers, can present difficulties in their separation from the aqueous phase and in their drying, storage, and subsequent handling. In the case of polychloroprene, this method is inapplicable and requires cold or hot coagulation processes.

In order to develop, the rubber industry thus needs to obtain and use free-running powders which are easy to store and handle, and usable in less sophisticated processing equipment than the conventional equipment.

The use of basic aluminum chloride for the preparation of powdered resins has been previously described in Japanese Patent Publication No. 14, 549/74, which applies it to resins containing 20–80% rubber polymers. According to this application, flocculation of the resin from the aqueous emulsion is carried out at ambient temperature followed by heating and then rapid cooling. This technique is not effective for obtaining powders from elastomer latexes.

SUMMARY OF THE INVENTION

The purpose of the present invention is to provide a process for separating rubbers from their latexes in the form of particles with diameters between 0.1 and 5 mm, easily filtrable, not tacky, and having no tendency to agglomerate.

It has now been found that it is possible to obtain an elastomer powder by flocculating the latex of an elastomer with the aid of aluminum polyhydroxychlorides, provided that flocculation is carried out at a high temperature taking into account other parameters such as the concentration of aluminum polyhydroxychloride, the ratio between the aluminum polyhydroxychlorides and the solid rubber materials, and the pH of the flocculant medium.

According to the present invention, the process of separating powdered rubbers from their latexes in the form of particles with diameters between 0.1 and 5 mm is characterized by flocculation with the aid of aluminum polyhydroxychlorides at a temperature between 70° C. and 100° C., then separating the powder from the aqueous phase.

"Aluminum polyhydroxychlorides" are understood to be what are also conventionally called aluminum oxychlorides and basic aluminum chlorides. These substances, available on the market, of variable composition with the approximate formula $(Al)_n(OH)_m Cl_{3n-m}$, can be polymerized to a greater or lesser degree. They may contain variable quantities of sulfate, nitrate, or phosphate ions.

The particle size of the powdered rubber obtained according to the present invention is influenced by the pH value of the latex and the coagulation bath and by the ratio between the aluminum polyhydroxychloride and the solid rubber materials.

By appropriately adjusting the various parameters it is possible to regulate the average rubber particle size within precise limits. The best results can be determined in each individual case by means of a few preliminary tests according to the nature and concentration of the latex, the nature and quantity of the emulsifiers present, and the exact composition of the aluminum salt used.

The concentration of aluminum polyhydroxychlorides expressed in $Al^{+++}$ in the flocculation bath is advantageously between 0.05 and 0.5% by weight with respect to the water and preferably between 0.1 and 0.2%. The flocculation baths produced from these salts have a pH value of less that 5. It may be advantageous to modify the acidity of these baths. In this case, it is preferable to add a strong mineral acid such as hydrochloric acid, sulfuric acid, or phosphoric acid; their concentration in the flocculation bath can vary from 0 to 0.5% by weight for hydrochloric acid (the concentration of the other acids being calculated according to their functionality).

The pH of the rubber latex will preferably be between 6 and 13. Alkaline latexes, which are obtained in the routine manner, can be used as they are or acidified to the desired value with a mineral or organic acid. A weak acid such as acetic acid is preferred.

Temperatures favorable for obtaining powders with particle sizes between 0.1 and 5 mm are those between 70° C. and 100° C. Low temperatures lead to macroagglomerates which are not desirable.

The process can be carried out continuously or discontinuously. It is preferable to add the latex slowly to the flocculation bath raised to or held at the proper temperature, with vigorous stirring.

DETAILED DESCRIPTION OF PREFERRED EMBODIMENTS

According to a particularly advantageous embodiment, the process is implemented by simultaneously introducing latex and a concentrated aqueous solution of aluminum polyhydroxychloride, possibly a mineral-acidic aqueous solution thereof into the flocculation bath held at a temperature of between 70° C. and 100° C., preferably between 80° C. and 100° C., with vigorous mechanical mixing. The ratios between the aluminum polyhydroxychloride contained in the aqueous solution added and the solid rubber materials contained in the latex are between 0.002 and 0.025 expressed in $Al^{+++}$ and preferably between 0.005 and 0.015. The concentration of commercial aluminum salt in the flocculation bath is advantageously between 0.5% and 4% by weight with respect to the water, the mean value evaluated at equilibrium.

In practice, the continuous process can be implemented, for example, as described below:

The operating equipment consists of two reservoirs supplied with dispensers, one containing the latex and the other with the aqueous solution of aluminum polyhydroxychlorides; the reservoirs are connected to a series of baths arranged in a cascade, which will spill over when full, equipped with stirrers, heaters, and a continuous recycling system for the flocculation bath. The last bath is connected with a device for spin drying and possibly washing. The flocculation baths are filled with aqueous solution of aluminum polyhydroxychloride which is heated and kept at a constant temperature of between 70° C. and 100° C. The rubber latex and the aqueous solution of aluminum polyhydroxychlorides contained in the reservoirs are then introduced continuously and simultaneously. The powder which immediately forms in the first bath spills over and runs continuously into the downstream baths. After treatment, it is easy to separate it from the aqueous phase by filtration, centrifuging, or other similar techniques. It can be washed in water several times in succession and then spin-dried to reduce the amount of impurities. The powders, which still contain a large proportion of water, usually evaluated at about 70% but reduceable to far lower percentages, for example, 50%, are finally dried by classical means; fluidized and venturi drying equipment are very suitable.

It is quite remarkable that the powdered rubbers obtained according to the present invention are completely free-running and have no tendency to stick together, particularly when filtered in the moist state. It is, of course, possible to reinforce the agglomeration resistance of dry powders with conventional anticlogging agents such as talc, silica, calcium stearate, compounds of the fatty amide type, polyethylene, and polyvinyl chloride. The anticlogging agent will preferably be introduced after the filtration stage and before or during the drying phase.

The process according to the present invention also has the advantage of being operable with latexes with viscosities lower than those which would be necessary to carry out the hot or cold coagulation techniques in the form of a film, for example on a rotating drum.

The physical and mechanical characteristics of the rubbers isolated in this manner, in particular, the Mooney viscosity characteristics, are not substantially modified by comparison with standard grades, so that the powders can be used just like rubbers isolated according to conventional methods in the same fields of application.

The invention will be illustrated with the aid of the nonlimitative examples given hereinbelow.

EXAMPLE 1

A polychloroprene latex containing 37% solid matter with a pH of 12.5 is used. The latex was prepared by emulsion polymerization in the presence of disproportionated abietic acid sodium salt, sodium salt from the condensation product of formaldehyde-naphthalenesulfonic acid, trisodium phosphate, and with the aid of a persulfate as a catalyst. For the detailed description of this method, refer to French Pat. No. 1,409,005.

In addition, a "flocculating" bath containing a 2% aqueous solution of aluminum polyhydroxychloride is prepared (trademark WAC from the Societe Produits Chimiques Ugine Kuhlmann).

The apparatus used consists of two baths with stirrers mounted in series and equipped with a variable flow recycling loop.

The total capacity of the system is 100 liters. The bath is raised to 85° C. and kept constantly at this temperature. The polychloroprene latex and aqueous solution of aluminum polyhydroxychloride titrating 5% of $Al^{+++}$ are then introduced continuously and simultaneously, the former at the rate of 15 l/hr. and the latter at the rate of 1 l/hr. The powder flocculated in the first bath passes to the second bath and is then spin-dried, washed with cold water, spin-dried again (wetness 70%) and mixed intimately with talc (3% by weight with respect to the dry rubber), then dried in a fluidized bed dryer until the residual moisture is less than 0.5%.

The polychloroprene, in the form of a very free-running powder, has a mean particle size of 0.1 to 5 mm, 36% of the particles having a diameter of 0.4 to 0.75 mm.

EXAMPLE 2

The process according to Example 1 is repeated, but the initial latex pH is reset to 6.1 by addition of an aqueous solution of 10% acetic acid.

The polychloroprene powder still has a mean particle size of 0.1 to 5 mm after drying, but 35% of the particles have a diameter of between 0.9 and 1.5 mm.

EXAMPLE 3

The process according to Example 1 is repeated but an aqueous solution of hydrochloric acid (180 g/l) is introduced continuously into the flocculation bath at the rate of 0.75 l/hr.

Polychloroprene is obtained in the powder form, 79% of the particles having a diameter of between 0.4 and 1.5 mm.

EXAMPLE 4

The process is repeated according to Example 1 but the WAC (registered trademark of the PUCK Company) is replaced by OCAL (trademark of the PROTEX Company) which is also an aluminum polyhydroxychloride. The polychloroprene is still in the form of a very free-running powder with a particle size of between 0.1 and 5 mm.

EXAMPLE 5

The process according to Example 1 is repeated except that the bath temperature is set at 60° C. and kept constantly at this value.

The polychloroprene powder is far less free-running. 22% of the particles have a diameter greater than 5 mm. The presence of very large lumps amounting to more than 10 mm is also noted.

Table 1 shows the details of the particle sizes of the powders obtained from the same polychloroprene latex according to examples 1–5. The influence of the pH and temperature on the particle size will be noted.

TABLE 1

| Mesh Size (mm) | Cumulative Weight % | | | | |
|---|---|---|---|---|---|
| | Ex. 1 | Ex. 2 | Ex. 3 | Ex. 4 | Ex. 5 |
| >5 | 0 | 0 | 0 | 0 | 21.7 |
| >3 | 6 | 8 | 7.2 | 8.0 | 48.2 |
| >1.48 | 15.5 | 19.3 | 16.5 | 21.2 | 68.4 |
| >0.92 | 37.3 | 54.2 | 41.8 | 45.7 | 82.5 |
| >0.75 | 58.5 | 71.3 | 70.1 | 71.3 | 95.6 |
| >0.36 | 94.3 | 92.8 | 95.6 | 89.5 | 97.2 |
| >0.10 | 99.5 | 98.7 | 99.1 | 98.4 | 98.9 |
| ≦0.10 | 0.5 | 1.3 | 0.9 | 1.6 | 1.1 |

EXAMPLE 6

Discontinuous Process

Three liters of a 2% aqueous solution of aluminum polyhydroxychloride (WAC) is poured into a container fitted with a stirrer. The bath temperature is raised to 80° C. and then one liter of polychloroprene latex containing 37% solid matter, with a pH of 12.5, is poured slowly while stirring. A well-dispersed and easily filtrable polychloroprene powder is obtained directly. After spin-drying, the powder is treated according to Example 1 and has the same particle size.

This example is repeated for purposes of comparison with the flocculation bath at ambient temperature. When the latex is added to the flocculation bath, polymers are seen to agglomerate around the stirrer, bringing it to a stop when 0.3 liter of latex have been added. The mixture is heated at the rate of 3° C./min. up to 95° C. The agglomerate does disaggregate to a very small degree during this treatment, but no powder can be obtained.

EXAMPLE 7

Comparative Example

The process according to Example 1 is repeated but the aluminum polyhydroxychloride is replaced by aluminum sulfate in the flocculation bath at a concentration of 1% by weight $Al_2(SO_4)_3.9H_2O$.

Flocculation of the latex is effective but the powder obtained reagglomerates very rapidly during spin-drying so that a free-running powder with the desired particle size cannot be obtained. The same disadvantages are observed if aluminum sulfate is replaced by the same quantity of aluminum chloride ($AlCl_3.6H_2O$).

EXAMPLE 8

A butadiene-styrene copolymer latex (SBR) containing 23% combined styrene and 28% solid matter is used; the initial pH of the latex is 11.7.

The operation is conducted as before.

The temperature of the flocculation bath is held at a constant 90° C. The aqueous solution of aluminum polyhydroxychloride is added at a constant rate of 1.5 l/hr.

After spin-drying, the SBR powder is mixed intimately with 2% by weight calcium stearate.

After the SBR powder obtained is dried, the particle size is measured:

| Mesh Size (mm) | Cumulative Weight % |
|---|---|
| >5 | 0 |
| >3 | 1.5 |
| >1.48 | 8.7 |
| >0.92 | 25.8 |
| >0.75 | 57.5 |
| >0.36 | 83.2 |
| >0.10 | 97.9 |
| ≦0.10 | 2.1 |

EXAMPLE 9

A butadiene-acrylonitrile copolymer latex (NBR) contailing 28% copolymerized acrylonitrile and 30% solid matter is used. The initial pH of the latex is 11.1.

The latex is introduced continuously at a rate of 20 l/hr. and the aqueous solution of aluminum polyhydroxychloride is introduced at a rate of 1.8 l/hr.

When the NBR powder has dried, the particle size is measured:

| Mesh Size (mm) | Cumulative Weight % |
|---|---|
| >5 | 0 |
| >3 | 0.9 |
| >1.48 | 10.0 |
| >0.92 | 35.2 |
| >0.75 | 56.8 |
| >0.36 | 91.1 |
| >0.10 | 97.7 |
| ≦0.10 | 2.3 |

EXAMPLE 10

A polychloroprene latex copolymerized with sulfur and peptized with a thiurame as described for example in French Pat. No. 1,349,819, is used. The latex has a pH of 11.3 and contains 33% solid matter.

The process according to Example 1 is repeated and a very free-running powder with the following particle size is obtained after drying:

| Mesh Size (mm) | Cumulative Weight % |
|---|---|
| >5 | 0 |
| >3 | 8 |
| >1.48 | 21.2 |
| >0.92 | 43.1 |
| >0.75 | 65.8 |
| >0.36 | 88.1 |
| >0.10 | 98.3 |
| ≦0.10 | 1.7 |

EXAMPLE 11

A latex of polychloroprene modified with sulfur and dialkylxanthogen disulfide is prepared, then peptized with the aid of mercaptans as described in U.S. Pat. No. 3,808,183. The emulsifier consists of disproportionated resin acid, and sodium salt from the condensation product of formaldehyde, sulfonic naphthalene acid, and trisodium phosphate. The latex has a pH of 12.1 and contains 37.3% solid matter.

The process according to Example 1 is repeated with the difference that the polychloroprene latex is introduced continuously at a rate of 20 l/hr. while the aqueous solution of aluminum polyhydroxychloride is introduced simultaneously at the rate of 1.5 l/hr. as well as an aqueous solution of orthophosphoric acid (98 g/l) at a rate of 1.2 l/hr.

After drying, a free-running powder with the following particle size is obtained:

| Mesh Size (mm) | Cumulative Weight % |
| --- | --- |
| >5 | 0 |
| >3 | 5.2 |
| >1.48 | 18.8 |
| >0.92 | 34.2 |
| >0.75 | 66.0 |
| >0.36 | 85.2 |
| >0.10 | 99.1 |
| ≦0.10 | 0.9 |

It is understood that the present invention is not limited to the examples hereinabove which are provided only for illustration. In particular, the latex preparation process must not be considered a restriction on the scope of the invention, nor must the traditional compounding ingredients such as fillers, anti-oxidizers, stabilizers, plasticizers, and others which may be incorporated therein. It is also obvious that the basic latex can be made of a mixture of latexes with identical or different polymers obtained independently by emulsion polymerization.

What is claimed is:

1. A process for the recovery of free-flowing powders of rubber with a mean particle size lower than 5 mm, from a latex thereof, said rubber consisting essentially of a homopolymer of butadiene, a homopolymer of chloroprene, a copolymer of butadiene with styrene, a copolymer of butadiene with acrylonitrile, or a copolymer of chloroprene with 2,3-dichloro-1,3-butadiene, comprising flocculating the latex in a flocculating bath with the aid of an aqueous solution of aluminum polyhydroxychloride while maintaining the flocculating bath at a temperature of between 70° C. and 100° C., then separating the powder from the aqueous phase and drying said powder.

2. A process in accordance with claim 1, wherein said flocculating step comprises introducing a concentrated aqueous solution of aluminum polyhydroxychloride simultaneously with the rubber latex into the flocculating bath, the weight ratio of the aluminum polyhydroxychloride expressed in $Al^{+++}$ in the concentrated aqueous solution to the solid rubber material in the latex being between 0.002 and 0.025.

3. A process in accordance with claim 1, wherein said flocculating step comprises introducing the rubber latex into a flocculating bath containing an aqueous solution of aluminum polyhydroxychloride with a concentration of between 0.05 and 0.5% by weight expressed in $Al^{+++}$, which flocculating bath is kept at a temperature of between 70° and 100° C.

4. A process in accordance with claim 1 wherein the latex has a pH of between 6 and 13.

5. A process in accordance with claim 1 wherein a strong mineral acid is added to the aluminum polyhydroxychloride solution.

6. A process in accordance with claim 2 wherein said weight ratio is between 0.005 and 0.015.

* * * * *